May 19, 1964 L. I. GOLDFISCHER ETAL 3,134,081

ADJUSTABLE BEAT FREQUENCY OSCILLATOR HAVING MULTIPLE FREQUENCY OUTPUTS

Filed Sept. 10, 1962

*INVENTOR.*
LESTER I. GOLDFISCHER
DAVID H. GROSSMAN
RALPH M. PINCUS

BY H. A. Mackey

ATTORNEY

United States Patent Office 3,134,081

Patented May 19, 1964

3,134,081

ADJUSTABLE BEAT FREQUENCY OSCILLATOR HAVING MULTIPLE FREQUENCY OUTPUTS

Lester I. Goldfischer, New Rochelle, N.Y., David H. Grossman, Stamford, Conn., and Ralph M. Pincus, New York, N.Y., assignors to General Precision, Inc., a corporation of Delaware Filed Sept. 10, 1962, Ser. No. 222,348

6 Claims. (Cl. 331—38)

Figure 1:
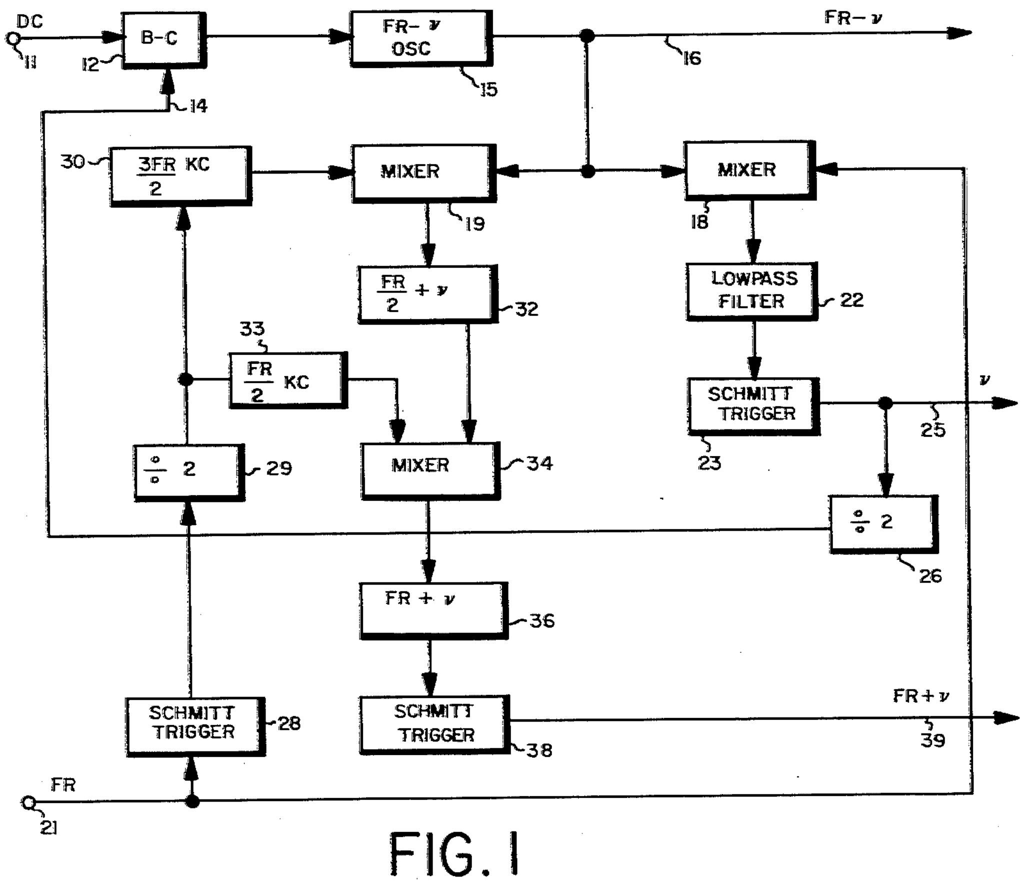

This invention relates to oscillators suitable for use in dual channel multiple beam Doppler navigation systems such as that disclosed in patent application Serial Number 718,376, filed February 28, 1958, by Lester I. Goldfischer, now U.S. Patent 2,903,565.

The novel oscillator may be directly substituted for the oscillator and associated components disclosed in the said application Serial Number 718,376 and will provide two frequencies equally spaced above and below a reference frequency as well as a frequency equal to one-half the frequency difference between said two equally spaced frequencies. The novel oscillator requires as an input the reference frequency and a direct current voltage. If the direct current voltage is made proportional to the velocity of an aircraft, the frequency separation of the equally spaced frequencies as well as one-half the difference will also be directly proportional to the aircraft velocity since they are proportional to the direct current voltage.

One object of this invention is to provide an oscillator for supplying two frequencies on separate conductors which are equally spaced above and below a reference frequency and a third frequency on another conductor equal to one-half the difference between the two equally spaced frequencies which is easily constructed and employs no critical circuit components.

Another object of this invention is to provide an oscillator as set forth above which is reliable in operation under adverse physical operating conditions.

The invention contemplates an oscillator for supplying on separate conductors two frequencies equally spaced above and below a reference frequency by an amount corresponding to a direct current voltage and a third frequency on another separate conductor equal to one-half the difference between the said equally spaced frequencies.

The foregoing and other objects and advantages of the invention will become more apparent from a consideration of the specification and drawings wherein one embodiment of the invention is described and shown in detail for illustration purposes only.

Figure 2:
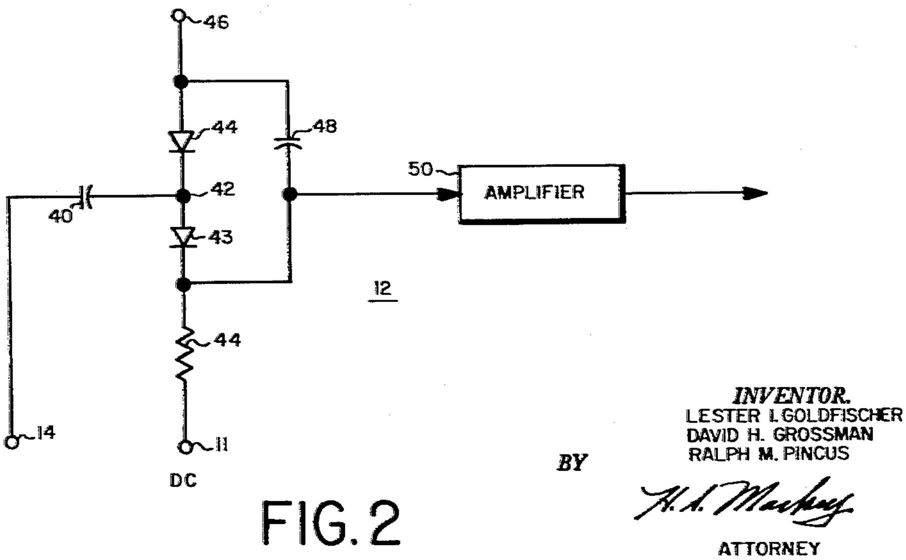

In the drawings:

FIGURE 1 is a block diagram of a novel oscillator constructed according to the invention; and FIGURE 2 is a schematic diagram of a bucket counter employed in the circuit shown in FIGURE 1.

In FIGURE 1 a direct current control voltage is applied to a terminal 11 which is connected to one input of a bucket counter 12. The control voltage is proportional to the velocity of an aircraft and is derived from an integrator in a frequency tracker, not shown. Application Serial Number 718,376 referred to above shows such an arrangement for supplying a direct current control voltage proportional to the aircraft velocity. However, the oscillator may be connected to any other type of source and need not be limited in its application to the structure disclosed in the above application.

Bucket counter 12 has another input 14 connected to a feedback loop which will be described later and supplies a direct current potential for controlling an oscillator 15. The frequency output of oscillator 15 is equal to a reference frequency ($F_R$) minus an increment $\nu$ which is a function of the direct current control voltage from the integrator which is proportional to the velocity. Thus the increment $\nu$ is proportional to the velocity and the oscillator frequency is displaced below the reference frequency ($F_R$) by an amount corresponding to the velocity of the Doppler system. The reference frequency may be 256 kc. or any other convenient or comparable frequency and is not critical. However, once selected it should not be permitted to vary any substantial amount.

The output of oscillator 15 is taken as one of the outputs on a conductor 16; it is also applied to two mixers 18 and 19. The other input of mixer 18 is connected to a terminal 21 which is connected to a source of alternating voltage, not shown, having a frequency ($F_R$). The sum and difference produces of ($F_R-\nu$) and ($F_R$) from mixer 18 are applied to a low-pass filter 22 which passes $\nu$ only. This is applied to a squaring circuit such as Schmitt trigger 23 which supplies a square wave output of frequency $\nu$ which is proportional to the velocity of the Doppler system. The output of trigger 23 is taken as another of the outputs on a conductor 25.

The output of Schmitt trigger 23 has its frequency divided by two in a circuit 26 and is then applied to input 14 of bucket counter 12. Bucket counter 12 supplies a direct current voltage proportional to the voltage applied to terminal 11 for controlling oscillator 15. Thus the frequency of the signal inserted at input 14 must follow the magnitude of the input voltage at terminal 11. How this is accomplished will be described in detail later in connection with the description of FIGURE 2.

A Schmitt trigger circuit 28 is connected to terminal 21 and provides a square wave output at a frequency ($F_R$). This output is frequency divided by two in a circuit 29 which provides a fundamental having a frequency equal to $$\frac{F_R}{2}$$

and a third harmonic with a frequency of $$\frac{3F_R}{2}$$

It also provides other harmonics; however, these are not utilized and do not otherwies affect circuit operation.

A filter 30 centered about a frequency equal to the third harmonic applied by circuit 29 is connected between the output of said circuit and an input to mixer 19 which supplies sum and difference products of the frequency supplied by oscillator 15 at the output of filter 30. These sum and difference products are applied to another filter 32. Filter 32 has a bandwidth which extends from a lower limit $$\frac{F_R}{2}$$

to an upper limit equal to the sum of $$\frac{F_R}{2}$$

and $\nu$ maximum which is approximately 50 kc. A filter 33 is also connected to the output of circuit 29 and is centered at the fundamental frequency supplied by the circuit which equals $$\frac{F_R}{2}$$

The outputs of filters 32 and 33 are applied to a mixer 34 which provides sum and difference products. Another filter 36 is connected to the output of mixer 34 and passes a band of frequencies between $F_R$ and $F_R+\nu$. Here again the bandwidth equals approximately 50 kc. which is the maximum value of $\nu$. It should be noted, however, that the maximum value of $\nu$ is determined by the maximum aircraft velocity. Thus, where an oscillator is designed to operate in a high performance aircraft, the value of $\nu$ may exceed 50 kc. This presents no problem since filters 32 and 36 are not critical and can have a much wider bandwidth than 50 kc.

In addition, filters 30 and 33 need not have sharp cutoffs since there are no frequencies applied to their inputs other than the second and fourth harmonics which could possibly affect operation and if $F_R$ is set at 256 kc. or thereabouts, the frequency separation between the second and the first harmonic and between the third and the fourth harmonic, is about 128 kc. Therefore, these filters need not be held within narrow limits. The output of filter 36 is squared in a Schmitt trigger circuit 38 which provides the third output at $F_R+\nu$ on a conductor 39.

The bucket counter 12, shown in FIGURE 2, has a capacitor 40 connected between feedback input 14 and a common junction 42. A diode 43 and a resistor 44 are serially connected between terminal 11 and junction 42. Another diode 44 is connected between junction 42 and a voltage source 46. Diode 43 has its anode connected to junction 42 while diode 44 has its cathode connected to this same junction. A high capacitance smoothing capacitor 48 is connected across diodes 43 and 44 and a high gain amplifier 50 is connected to the common junction of diode 43 and resistor 44.

The basic bucket counter shown in FIGURE 2 is fully described in United States Patent No. 2,584,866 of John W. Gray but will be briefly described here in order to assist in a complete understanding of the invention without reference to external material; however, both its use and connection vary materially from that disclosed in the above patent.

The square wave voltage applied through input 14 must under all circumstances have the same amplitude regardless of the frequency. During one-half cycle of operation capacitor 40 is charged through one of the diodes depending upon the relative polarities and magnitudes of the voltages of terminals 11 and 46. During the next half-cycle of operation the capacitor is discharged through the other diode. Capacitor 48 which should be very large is also charged during the charging cycle and provides smoothing. The current supplied by amplifier 50 is directly proportional to either the frequency of the input voltage at 14 or the voltage at terminal 11.

This may be proved mathematically. The current flowing into capacitor 40 is equal to the current flowing out and therefore $$i_{in}=i_{out} \qquad (1)$$

The charge Q on capacitor 40 is equal to the product of the peak-to-peak voltage at input 14 and the capacitance of capacitor 40.

$$Q=VC \qquad (2)$$

Both V and C are constant which makes Q a constant. Q is also equal to the integral per phase of $i_{in}dt$ and $i_{out}dt$ which may be expressed as follows;

$$Q=\oint i_{in}dt=\oint i_{out}dt \qquad (3)$$

The current I through resistor 44 with a voltage E at terminal 11 is equal to $$\frac{E}{R}$$

which also equals the average of $i_{in}$ or the integral per phase of $i_{in}dt$ divided by the integral per phase of $dt$ $$I=i_{in}\text{ average}=\frac{\oint i_{in}dt}{\oint dt} \qquad (4)$$

Since the reciprocal of the integral per phase of $dt$ equals frequency and the charge equals the integral per phase of $i_{in}dt$ $$I=FQ \qquad (5)$$

where F is the frequency of the input at 14.

By substituting, E, the voltage drop across resistor 44, equals FQR and $$FQR=VFRC$$
$$F=E/VRC=kE \qquad (6)$$

It is seen from the above that the frequency of the input at 14 is controlled by the voltage applied at input terminal 11. If a velocity error should occur, that is the actual velocity increase or decrease, the voltage at terminal 11 changes a proportional amount. This changes the control voltage applied to oscillator 15 as well as the frequency of input 14 to correspond to the new velocity of the aircraft. The bucket counter and the feedback loop make possible extreme short term frequency stability.

While only one embodiment of the invention has been shown and described in detail for illustration purposes, it should be clearly understood that the invention is not limited to the specific details disclosed.

What is claimed is:

1. An osciallor circuit for supplying on separate conductors two frequencies equally spaced above and below a reference frequency by an amount corresponding to a direct current voltage, and a third frequency on a third conductor equal to one-half the frequency difference between said equally spaced frequencies comprising,
   - a variable frequency oscillator controlled by a direct current voltage for providing an alternating voltage having a frequency equal to the above said reference frequency minus a frequency increment proportional to the magnitude of the said direct current voltage,
   - first means responsive to the variable oscillator output and to a source providing the said reference frequency for combining the said frequencies and deriving therefrom a frequency equal to the difference in frequency therebetween,
   - second means responsive to the output from said first means and to a source of direct current voltage for providing the direct current voltage for controlling said oscillator, said second means completing a feedback loop whereby said alternating voltage from said first means is maintained proportional to the direct current voltage from the source,
   - third means responsive to the said reference frequency for providing harmonic frequencies of said reference frequency, said frequencies equalling one-half and three-halves of the reference frequency,
   - fourth means responsive to the variable oscillator output and the output of the third means for combining said outputs and providing the difference between the frequency equal to three-halves the reference frequency and the oscillator output frequency,
   - and fifth means responsive to the fourth means and the third means for combining said outputs and providing an alternating output equal in frequency to the sum of the fourth means output frequency and the frequency output of the third means equal to one-half the said reference frequency.

2. An oscillator circuit as set forth in claim 1 in which the said second means includes, a pair of serially connected rectifiers poled in the same direction,
   - a first capacitor for connecting the common junction of the rectifiers to the output of the said first means,
   - resistive means for connecting one of said rectifiers to the said source of direct current voltage,
   - means for connecting the other rectifier to a constant source of potential,
   - a second capacitor connected in parallel with the said rectifiers, and a high gain amplifier connected to the common junction of the resistive means and the rectifier it is connected to for providing a direct current output which is a function of the magnitude and polarity of the direct current voltage.

3. An oscillator circuit as set forth in claim 1 in which the third means comprises, a circuit for frequency dividing the reference frequency by two, and a pair of filters for passing only the fundamental and the first harmonic, respectively, of the divided frequency.

4. An oscillator circuit for supplying on separate conductors two frequencies equally spaced above and below a fixed reference frequency $F_R$ by an amount $\nu$ corresponding to a direct current voltage, and a third frequency on a third conductor equal to one-half the frequency difference $$\frac{2\nu}{2}$$

between said equally spaced frequencies comprising, a variable frequency oscillator controlled by a direct current voltage for providing an alternating voltage having a frequency equal to the above said reference frequency $F_R$ minus a frequency increment proportional to the magnitude of the said direct current voltage $\nu$, said output having a frequency $F_R-\nu$, a first mixer responsive to the variable oscillator output $F_R-\nu$ and to a source providing the said reference frequency $F_R$ for supplying sum and difference frequencies, first means responsive to the first mixer output for passing the difference frequency only, said difference having a frequency $\nu$, second means responsive to the output from said first means and to a source of direct current voltage for providing the direct current voltage for controlling said oscillator, said second means in addition completing a feedback loop for maintaining the alternating voltage from said first means proportional in frequency to the magnitude of the direct current from the source, third means responsive to said reference frequency for providing at least two harmonic frequencies on first and second conductors equalling one-half and three-halves of the reference frequency, respectively, a second mixer responsive to the variable oscillator and the frequency on the second conductor for providing sum and difference frequencies, fourth means responsive to the second mixer for passing only the difference between the variable oscillator output $F_R-\nu$ and the harmonic frequency equal to $3F_R/2$, a third mixer responsive to the fourth means and the frequency on the first conductor for providing sum and difference frequencies, and fifth means responsive to said third mixer for passing only the sum of the fourth means frequency output $F_R/2+\nu$ and the harmonic frequency equal to $F_R/2$ which equals $F_R+\nu$.

5. An oscillator circuit as set forth in claim 4 in which the said second means includes, a pair of serially connected rectifiers poled in the same direction, a first capacitor for connecting the common junction of the rectifiers to the output of the said first means, resistive means for connecting one of said rectifiers to the said source of direct current voltage, means for connecting the other rectifier to a constant source of potential, a second capacitor connected in parallel with the said rectifiers, and a high gain amplifier connected to the common junction of the resistive means and the rectifier it is connected to for providing a direct current output which is a function of the magnitude and polarity of the direct current voltage.

6. An oscillator circuit as set forth in claim 4 in which the third means comprises, a circuit for frequency dividing the reference frequency by two, and first and second filters having first and second output conductors for passing only the fundamental and first harmonic, respectively, of the divided frequency.

No references cited.